US009035636B2

United States Patent
Colbeck et al.

(10) Patent No.: US 9,035,636 B2
(45) Date of Patent: May 19, 2015

(54) DIGITAL PEAK DETECTOR WITH FOLLOWER MODE

(71) Applicant: Power Integrations, Inc., San Jose, CA (US)

(72) Inventors: Roger Colbeck, Ottawa (CA); Lino Del Pup, Carp (CA)

(73) Assignee: Power Integrations, Inc., San Jose, CA (US)

( * ) Notice: Subject to any disclaimer, the term of this patent is extended or adjusted under 35 U.S.C. 154(b) by 77 days.

(21) Appl. No.: 14/028,793

(22) Filed: Sep. 17, 2013

(65) Prior Publication Data

US 2015/0078050 A1 Mar. 19, 2015

(51) Int. Cl.
*G05F 1/00* (2006.01)
*H02M 7/06* (2006.01)

(52) U.S. Cl.
CPC ................................. *H02M 7/066* (2013.01)

(58) Field of Classification Search
USPC .......................................... 323/282, 283, 285
See application file for complete search history.

(56) References Cited

U.S. PATENT DOCUMENTS

| 5,323,331 | A | * | 6/1994 | Schenk et al. | 702/66 |
| 5,594,384 | A | * | 1/1997 | Carroll et al. | 329/369 |
| 6,188,250 | B1 | * | 2/2001 | Voorman et al. | 327/58 |
| 6,191,621 | B1 | * | 2/2001 | Ota | 327/58 |
| 7,738,565 | B1 | * | 6/2010 | Pogrebinsky et al. | 375/242 |

* cited by examiner

*Primary Examiner* — Emily P Pham
(74) *Attorney, Agent, or Firm* — Morrison & Foerster LLP

(57) ABSTRACT

Circuits and processes for detecting a peak value of an input signal are disclosed. In one example, a peak detector circuit may sample a line sense signal, determine the peak value of the line sense signal during a search window, and output a peak detection signal representative of the determined peak value. In a first mode, the peak detector circuit may cause the peak detection signal to be representative of the determined peak value from an immediately preceding search window. In a second mode, the peak detector circuit may cause the peak detection signal to follow the sampled line sense signal. The peak detector circuit may operate in the second mode in response to the sample of the line sense signal being greater than a peak value of the line sense signal from an immediately preceding search window by more than a threshold amount.

30 Claims, 7 Drawing Sheets

DIGITAL PEAK DETECTOR WITH FOLLOWER MODE

BACKGROUND

1. Field:

The present disclosure relates generally to input signal detection circuits and, more specifically, to digital circuits for detecting a peak value of an input signal.

2. Discussion of the Related Art:

Many electronic devices, such as cell phones, laptop computers, etc., use direct current (dc) power to operate. Conventional wall outlets generally deliver a high-voltage alternating current (ac) power that needs to be transformed to dc power in order to be used as a power source by most electronic devices. Switched mode power converters are commonly used to transform ac power to dc power due to their high efficiency, small size, and low weight. In operation, a switched mode power converter may use a controller to control the switching (turning on and turning off) of a power switch to provide a desired output to a load. The controller may regulate the output at a desired level in response to a feedback signal representative of the output of the power converter. The controller may also provide power factor correction (PFC) to improve the power factor of the power converter.

The power factor may be defined as the ratio of the average power over a cycle to the product of the root mean square (rms) voltage and the rms current. That is, the power factor may represent the ratio of the amount of usable power to the amount of total power delivered to the load. As such, the power factor may have a value between zero and one, with unity power factor being the ideal.

A controller of a switched mode power converter may perform PFC in an attempt to achieve unity power factor, typically by shaping the input current waveform as closely as possible to the input voltage waveform. A controller that performs PFC may receive an input signal that is representative of a voltage signal produced by the high-voltage ac power source. The high-voltage ac power source may typically produce a cyclic voltage signal, such as, for example, a sine wave. The peak value of each cycle of the voltage signal or, in other words, the peak value of the input signal per each cycle, may be used by the controller for a variety of purposes, including controlling the switching of the power switch. The peak value of the input signal may increase or decrease from cycle to cycle.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Various embodiments directed to detecting a peak value of an input signal are disclosed. In one embodiment, the input signal may be a voltage signal and the peak value of the input signal may correspond to the detected peak voltage. In one example, a digital peak detector circuit may sample a digital line sense signal and may determine the peak value of the digital line sense signal during a search window and may be configured to output a peak detection signal representative of the determined peak value of the digital line sense signal. In one example, the digital peak detector circuit may operate in a first mode, causing the digital peak detection signal to be representative of the determined peak value from an immediately preceding search window. The digital peak detector circuit may further operate in a second mode, causing the digital peak detection signal to follow the sampled digital line sense signal. The digital peak detector circuit may operate in the second mode of operation in response to the sample of the digital line sense signal being greater than a peak value of the digital line sense signal from an immediately preceding search window by more than a threshold amount. The digital peak detector circuit may operate in the first mode of operation when not operating in the second mode of operation.

Figure 1:
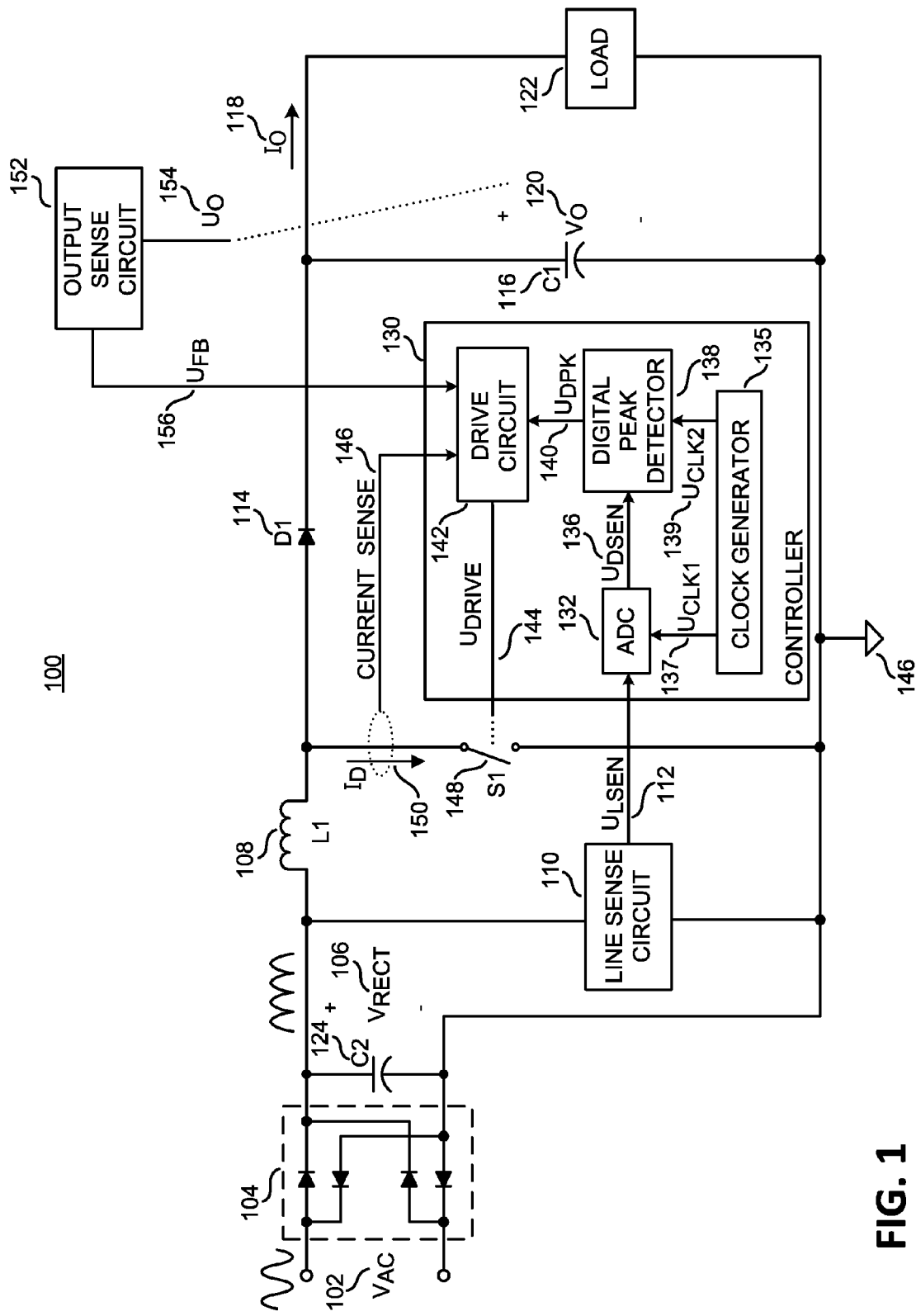
FIG. 1 shows a block diagram of an example switched mode power converter having a controller that includes a digital peak detector according to various examples of the present disclosure.

FIG. 1 shows a block diagram of an example switched mode power converter 100 having a controller 130 with a digital peak detector circuit 138. While switched mode power converter 100, also referred to as a power supply, is shown in FIG. 1 as a boost converter, it should be appreciated that other converter topologies may also be used.

As shown, power converter 100 may be coupled to receive an unregulated input voltage $V_{AC}$ 102 at its input and may be configured to deliver an output voltage $V_O$ 120 and an output current $I_O$ 118 to a load 122. In one example, input voltage $V_{AC}$ 102 may be an ac voltage. Power converter 100 may include rectifier circuit 104 coupled to receive input voltage $V_{AC}$ 102 and to output a rectified input voltage $V_{RECT}$ 106. Rectified input voltage $V_{RECT}$ 106 may be referenced to an input ground 146, which may also be referred to as an input return. Input return 146 represents the lowest potential or the lowest voltage against which all other voltages of switched mode power converter 100 are measured or defined. A capacitor C2 124 may be coupled across rectifier circuit 104 to smooth the noise in rectified input voltage $V_{RECT}$ 106.

Power converter 100 may further include a boost stage, which may include an energy transfer element L1 108, a power switch S1 148, an output diode D1 114, and an output capacitor C1 116. In the illustrated example, energy transfer element L1 108 includes an inductor coupled to the output of rectifier circuit 104 and to output diode D1 114. One terminal of power switch S1 148 may be coupled to inductor L1 108 and output diode D1 114, while the other terminal of power switch S1 148 may be coupled to input return 146. Power switch S1 148 may include a metal oxide semiconductor field effect transistor (MOSFET), a bipolar junction transistor (BJT), or the like. Output diode D1 114 may be coupled to output capacitor C1 116 and to the output of switched mode power converter 100.

Power converter 100 may further include controller 130 for controlling the switching of power switch S1 148 to control the energy transfer from the input to the output of switched mode power converter 100, thereby regulating an output quantity $U_O$ 154 (e.g., output voltage $V_O$ 120 and/or output current $I_O$ 118) at a desired level. In the illustrated example, controller 130 may provide a drive signal $U_{DRIVE}$ 144 to power switch S1 148 to control the switching (turning ON and turning OFF) of power switch S1 148. For example, in response to drive signal $U_{DRIVE}$ 144, power switch S1 148 may be switched to a closed position (also referred to as being turned ON or being in an ON state) and in turn, may conduct current that is represented by a switch current $I_D$ 150. Similarly, in response to drive signal $U_{DRIVE}$ 144, power switch S1 148 may be switched to an open position (also referred to as being turned OFF or being in an OFF state) in which it may substantially prevent current conduction. During the operation of switched mode power converter 100, when power switch S1 148 is in the ON state, the voltage across energy transfer element L1 108 becomes substantially equal to rectified input voltage $V_{RECT}$ 106 and causes switch current $I_D$ 150 to increase linearly resulting in energy to be stored in energy transfer element L1 108. When power switch S1 148 is in the OFF state, the energy stored in energy transfer element L1 108 while power switch S1 was conducting begins to transfer to output capacitor C1 116 and load 122. This energy transfer may produce a pulsating current in output diode D1 114, which may be filtered by output capacitor C1 116 to produce a substantially constant output voltage $V_{OUT}$ 120. In another example, the switching of power switch S1 148 may produce a substantially constant output current $I_O$ provided to load 122.

It is further depicted that controller 130 senses switch current $I_D$ 150 in power switch S1 148 as current sense signal 146. Any known technique to sense current, such as for example receiving the voltage across a resistor conducting the current, or for example receiving a scaled current from a current transformer, or for example receiving the voltage across the on-resistance of a MOSFET that conducts the current, may be used to sense switch current $I_D$ 150 and to provide current sense signal 146 to controller 130.

In one example, controller 130 may be implemented as a monolithic integrated circuit, may be implemented with discrete electrical components, or may be implemented using a combination of discrete and integrated circuits. In addition, controller 130 and power switch S1 148 may form a part of an integrated circuit that is manufactured as either a hybrid or a monolithic integrated circuit.

As shown in FIG. 1, controller 130 may be coupled to receive a feedback signal $U_{FB}$ 156, which may be representative of output quantity $U_O$ 154, and line sense signal $U_{LSEN}$ 112, which may be representative of rectified input voltage $V_{RECT}$ 106 (and hence, input voltage $V_{AC}$ 102). In one example, power converter 100 may include output sense circuit 152 coupled to sense output quantity $U_O$ 154 and configured to generate feedback signal $U_{FB}$ 156 in response to output quantity $U_O$ 154. Power converter 100 may further include line sense circuit 110 coupled to receive rectified input voltage $V_{RECT}$ 106 and configured to output line sense signal $U_{LSEN}$ 112, which may be a scaled version of rectified input voltage $V_{RECT}$ 106. In one example, line sense circuit 110 may include a resistive divider and may be configured such that line sense signal $U_{LSEN}$ 112 may represent rectified input voltage $V_{RECT}$ 106 divided by 100.

As further illustrated in FIG. 1, controller 130 may include an analog-to-digital converter (ADC) 132, a digital peak detector circuit 138, a clock generator 135 and a drive circuit 142. ADC 132 may be coupled to receive line sense signal $U_{LSEN}$ 112 and a first clock signal $U_{CLK1}$ 137 and configured to output a digital line sense signal $U_{DSEN}$ 136, which may include a sequence of digital count signals (e.g., samples) that are separated by the sampling period (inverse of the sampling frequency) of ADC 132. Each digital count signal may represent the value of line sense signal $U_{LSEN}$ 112 at a certain instance in time. In one example, each digital count signal may include an 8-bit binary signal. As shown, digital peak detector circuit 138 may be coupled to receive digital line sense signal $U_{DSEN}$ 136 and a second clock signal $U_{CLK2}$ 139. Digital peak detector circuit 138 may detect the peak value of digital line signal $U_{DSEN}$ 136 and generate a digital peak signal $U_{DPK}$ 140 that is representative of the detected peak value of digital line signal $U_{DSEN}$ 136 (and hence, also representative of the detected peak value of line sense signal $U_{LSEN}$ 112).

In the example controller depicted in FIG. 1, clock generator 135 produces first clock signal $U_{CLK1}$ 137 and second clock signal $U_{CLK2}$ 139 and provides them to ADC 132 and digital peak detector circuit 138, respectively. In one example, first clock signal $U_{CLK1}$ 137 and second clock signal $U_{CLK2}$ 139 may be periodic signals with the same frequency. In another example, first clock signal $U_{CLK1}$ 137 and second clock signal $U_{CLK2}$ 139 may be periodic signals with different frequencies. In operation, ADC 132 may use first clock signal $U_{CLK1}$ 137 to set the sampling period and digital peak detector circuit 138 may use second clock signal $U_{CLK2}$ 139 to set some of the internal parameters, such as a refresh period, a lockout period, etc. While FIG. 1 shows ADC 132 and digital peak detector circuit 138 receiving first clock signal $U_{CLK1}$ 137 and second clock signal $U_{CLK2}$ 139 from clock generator 135, in other examples, ADC 132 and digital peak detector circuit 138 may receive first clock signal $U_{CLK1}$ 137 and second clock signal $U_{CLK2}$ 139 from a source and/or other sources external to controller 130. It should also be noted, in yet another example, ADC 132 may be a part of digital peak detector circuit 138 and digital peak detector circuit 138 may be coupled to receive both first clock signal $U_{CLK1}$ 137 and second clock signal $U_{CLK2}$ 139.

In the illustrated example, drive circuit 142 may be coupled to receive current sense signal 146, digital peak signal $U_{DPK}$ 140 from digital peak detector circuit 138 and feedback signal $U_{FB}$ 156 from output sense circuit 152. In operation, drive circuit 142 may output drive signal $U_{DRIVE}$ 144 based at least in part on current sense signal 146, digital peak signal $U_{DPK}$ 140 and feedback signal $U_{FB}$ 156 to regulate the output quantity $U_O$ 154 of power converter 100. In another example, drive circuit 142 may adjust drive signal $U_{DRIVE}$ 144 in response to digital peak signal $U_{DPK}$ 140 to improve the power factor of power converter 100.

Figure 2:
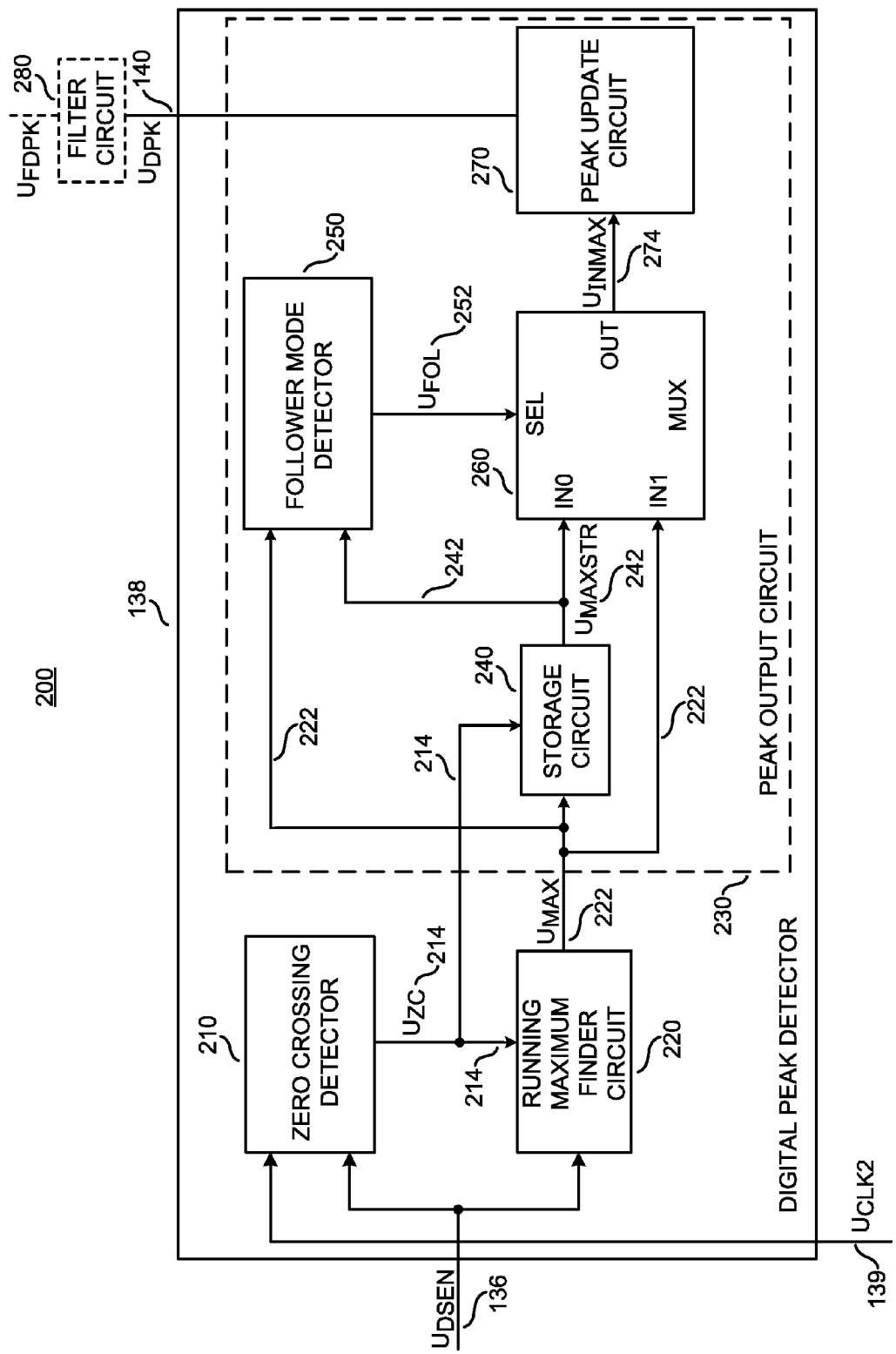
FIG. 2 shows a block diagram of an example digital peak detector circuit according to various examples of the present disclosure.

FIG. 2 is a block diagram 200 of an example digital peak detector circuit 138 that can be used in controller 130 of FIG. 1. As shown, digital peak detector circuit 138 may generally include a zero crossing detector circuit 210, a running maximum finder circuit 220, and a peak output circuit 230.

In one example, zero crossing detector circuit 210 may be coupled to receive second clock signal $U_{CLK2}$ 139 and digital line sense signal $U_{DSEN}$ 136 from ADC 132 (shown in FIG. 1). Zero crossing detector circuit 210 may be configured to output a zero crossing signal $U_{ZC}$ 214 indicating the occurrence of the value of digital line sense signal $U_{DSEN}$ 136 falling to a value equal to or less than a detection threshold, which may be a value that can be used to identify cycles of rectified input voltage $V_{RECT}$ 106 as defined by its minimum values at the start and end of each cycle. In an ideal case, the detection threshold may be zero volts. However, ADC 132 may have a low frequency pole that results in an averaging of digital line sense signal $U_{DSEN}$ 136 over the sampling period of ADC 132. Furthermore, capacitor C2 124 may not fully discharge during the zero crossing of input voltage $V_{AC}$ 102 when power converter 100 is operating with a light load. This means that digital line sense signal $U_{DSEN}$ 136 for a sine wave input voltage $V_{AC}$ 102 may not reach zero volts. As a result, the detection threshold may be set to a non-zero value such that the worst case for a sine wave input voltage $V_{AC}$ 102, which occurs when input voltage $V_{AC}$ 102 is equal to the maximum supported input voltage at the highest supported input frequency, can be accounted for. For example, the detection threshold may be set to 36V for a power converter 100 that has a sine wave input voltage $V_{AC}$ 102 having a peak voltage of 375V and a controller 130 with an ADC 132 having a sampling frequency of 1500 Hz.

The time between consecutive occurrences of the value of digital line sense signal $U_{DSEN}$ 136 falling to a value equal to or less than the detection threshold as indicated by zero crossing signal $U_{ZC}$ 214 may be referred to herein as a "search window." This search window represents a time period for which running maximum finder circuit 220 may identify a maximum value of digital line sense signal $U_{DSEN}$ 136. In other words, running maximum finder circuit 220 may identify the maximum value of digital line sense signal $U_{DSEN}$ 136 that occurs during each search window corresponding to a full cycle of digital line sense signal $U_{DSEN}$ 136 (and thus, each full cycle of line sense signal $U_{DSEN}$ 112 and rectified input voltage $V_{RECT}$ 106).

In one example, zero crossing signal $U_{ZC}$ 214 may include a binary signal that may toggle between logic low (digital 0) and logic high (digital 1) levels. In particular, zero crossing signal $U_{ZC}$ 214 may be a short pulse that is logic high for a certain period of time when the falling edge of digital line sense signal $U_{DSEN}$ 136 (e.g., transition from a higher value to a lower value) reaches the detection threshold and is logic low at other times (or vice versa). In another example, zero crossing signal $U_{ZC}$ 214 may be a short pulse that is logic high for a certain period of time when the rising edge of digital line sense signal $U_{DSEN}$ 136 (e.g., transition from a lower value to a higher value) reaches the detection threshold and is logic low at other times (or vice versa). In both examples, the search window may correspond to the time period between consecutive pulses of zero crossing signal $U_{ZC}$ 214.

In operation, zero crossing signal $U_{ZC}$ 214 may be expected to transition from a logic low level to a logic high level within a certain time period (also referred to as a refresh period) after it had previously transitioned to that logic low level from a logic high level. In other words, a search window may be expected to terminate after a certain period of time. Since digital line sense signal $U_{DSEN}$ 136 (and hence, line sense signal $U_{DSEN}$ 112) may be representative of rectified voltage $V_{RECT}$ 106, this time period (e.g., refresh period) may roughly correspond to the time period between rectified voltage $V_{RECT}$ 106 reaching its minimum value during each full cycle. However, in some instances (e.g., due to an undesired offset voltage, distortion, or power converter 100 operating with a light load), digital line sense signal $U_{DSEN}$ 136 may not drop to a value equal to or less than the detection threshold within the refresh period after previously rising above the detection threshold. In some examples, to prevent running maximum finder circuit 220 from obtaining a sample of digital line sense signal $U_{DSEN}$ 136 during a search window that is larger than the full cycle of digital line sense signal $U_{DSEN}$ 136, zero crossing detector circuit 210 may be configured to transition zero crossing signal $U_{ZC}$ 214 to a logic high level after the refresh period in order to limit the duration of the search window to one full cycle of digital line sense signal $U_{DSEN}$ 136 (and hence, line sense signal $U_{LSEN}$ 112) at the lowest supported input frequency. For example, if power converter 100 is configured to be used with an input voltage $V_{AC}$ 102 having a frequency between 45-65 Hz and first and second clock signals $U_{CLK1}$ 137 and $U_{CLK2}$ 139 having the same frequency of approximately 1500 Hz, the refresh period may be selected to be longer than a half cycle (since a half cycle of input voltage $V_{AC}$ 102 corresponds to a full cycle of digital line sense signal $U_{DSEN}$ 136 and line sense signal $U_{DSEN}$ 112) at 45 Hz. As such, the refresh period may be selected to be 18 first clock signal $U_{CLK1}$ 137 or second clock signal $U_{CLK2}$ 139 periods (12 ms).

In some instances, line sense signal $U_{DSEN}$ 112 may have a glitch characterized by a sudden drop in the voltage level that is large enough to cause digital line sense signal $U_{DSEN}$ 136 to fall to a value equal to or less than the detection threshold. This may cause zero crossing detector 210 to transition zero crossing signal $U_{ZC}$ 214 to a logic high level earlier than the actual zero crossing of line sense signal $U_{DSEN}$ 112. As a result, the search window may be terminated prematurely, causing a potentially lower maximum value being determined by running maximum finder circuit 220. Thus, in some examples, zero crossing detector 210 may be configured to prevent zero crossing signal $U_{ZC}$ 214 from transitioning to a logic high level for a threshold duration (also referred to as a lockout period), even if digital line sense signal $U_{DSEN}$ 136 falls to a value equal to or less than the detection threshold. In other words, zero crossing detector circuit 210 may set a minimum search window equal to the lockout period. In one example, zero crossing detector circuit 210 may set the lockout period such that the number of digital line sense signal $U_{DSEN}$ 136 samples that fall within the lockout period can be sufficient to encompass one half cycle of line sense signal $U_{DSEN}$ 112 at the lowest supported input frequency. Therefore, referring to the example mentioned above, the lockout period may be selected to be 10 first clock signal $U_{CLK1}$ 137 or second clock signal $U_{CLK2}$ 139 periods (6.7 ms). This may allow running maximum finder circuit 220 to at least sample the first half of each full cycle of digital line sense signal $U_{DSEN}$ 136, which may be sufficient for running maximum finder circuit 220 to sample the peak value of digital line sense signal $U_{DSEN}$ 136 in each cycle.

Digital peak detector circuit 138 may further include running maximum finder circuit 220 coupled to receive digital line sense signal $U_{DSEN}$ 136 and zero crossing signal $U_{ZC}$ 214. Running maximum finder circuit 220 may be configured to output a maximum signal $U_{MAX}$ 222 representative of the maximum value of digital line sense signal $U_{DSEN}$ 136 in each search period as defined by zero crossing signal $U_{ZC}$ 214. Since each search period may include one full cycle of digital line sense signal $U_{DSEN}$ 136 (and hence, line sense signal $U_{DSEN}$ 112), maximum signal $U_{MAX}$ 222 may represent the peak value of line sense signal $V_{LSEN}$ 112 in each cycle. In one example, maximum signal $U_{MAX}$ 222 may include an 8-bit binary signal. In operation, running maximum finder circuit 220 may set maximum signal $U_{MAX}$ 222 to zero when zero crossing signal $U_{ZC}$ 214 becomes logic high (starting a new search period). As new samples of digital line sense signal $U_{DSEN}$ 136 arrive at a frequency determined by first sampling clock signal $U_{CLK1}$ 137, running maximum finder circuit 220 may compare the value represented by maximum signal $U_{MAX}$ 222 with each new sample. If the new sample is greater than the value represented by maximum signal $U_{MAX}$ 222, running maximum finder circuit 220 may change maximum signal $U_{MAX}$ 222 to represent the value of the new, larger sample. If, however, the new sample is not greater than the value represented by maximum signal $U_{MAX}$ 222, running maximum finder circuit 220 may leave maximum signal $U_{MAX}$ 222 unchanged. When zero crossing signal $U_{ZC}$ 214 becomes logic high again, indicating the end of the presently occurring search window and the start of a new search window, maximum signal $U_{MAX}$ 222 may again be set to a value of digital line signal $U_{DSEN}$ 136 at the time zero crossing signal $U_{ZC}$ 214 becomes logic high (usually a value representing zero).

Digital peak detector circuit 138 may further include peak output circuit 230 coupled to receive zero crossing signal $U_{ZC}$ 214 and maximum signal $U_{MAX}$ 222. Peak output circuit 230 may be configured to generate digital peak signal $U_{DPK}$ 140, which may be representative of the detected peak value of digital line signal $U_{DSEN}$ 136 (which is representative of line sense signal $U_{DSEN}$ 112).

Peak output circuit 230 may be configured to operate in two modes. In the first mode of operation, also referred to as a normal mode of operation, peak output circuit 230 may set the value of digital peak signal $U_{DPK}$ 140 at the time that zero crossing signal $U_{ZC}$ 214 becomes logic high. More specifically, digital peak signal $U_{DPK}$ 140 may be set to the value of maximum signal $U_{MAX}$ 222 when a new search window begins. As a result, digital peak signal $U_{DPK}$ 140 may represent the peak value of digital line signal $U_{DSEN}$ 136 during the immediately preceding search window. In one example, peak output circuit 230 may compare the value of maximum signal $U_{MAX}$ 222 to a minimum peak threshold $V_{PKMIN}$, which may represent the minimum expected peak value of digital line signal $U_{DSEN}$ 136. If maximum signal $U_{MAX}$ 222 is greater than the minimum peak threshold $V_{PKMIN}$, peak output circuit 230 may set digital peak signal $U_{DPK}$ 140 to the value of maximum signal $U_{MAX}$ 222, as described above. If, however, maximum signal $U_{MAX}$ 222 is not greater than the minimum peak threshold $V_{PKMIN}$, peak output circuit 230 may set digital peak signal $U_{DPK}$ 140 to the minimum peak threshold $V_{PKMIN}$.

In the second mode of operation, also referred to as a follower mode of operation, peak output circuit 230 may set digital peak signal $U_{DPK}$ 140 to the value of maximum signal $U_{MAX}$ 222 in the presently occurring search window. Thus, in the second mode of operation, peak output circuit 230 may update digital peak signal $U_{DPK}$ 140 with the value of maximum signal $U_{MAX}$ 222 at every sampling period rather than at every search window, as performed in the first mode of operation. In one example, peak output circuit 230 may operate in the second mode when maximum signal $U_{MAX}$ 222 in the presently occurring search window (e.g., the present sample of digital line sense signal $U_{DSEN}$ 136) is greater than maximum signal $U_{MAX}$ 222 of the immediately preceding search window by more than a threshold amount. Additionally, as discussed above with respect to the first mode, peak output circuit 230 may also compare the value of maximum signal $U_{MAX}$ 222 to a minimum peak threshold $V_{PKMIN}$ in the second mode of operation. Thus, in the second mode of operation, if maximum signal $U_{MAX}$ 222 is greater than the minimum peak threshold $V_{PKMIN}$, peak output circuit 230 may set digital peak signal $U_{DPK}$ 140 to the value of maximum signal $U_{MAX}$ 222 in the presently occurring search window, as described above. If, however, maximum signal $U_{MAX}$ 222 is not greater than the minimum peak threshold $V_{PKMIN}$, peak output circuit 230 may set digital peak signal $U_{DPK}$ 140 to the minimum peak threshold $V_{PKMIN}$.

As illustrated in FIG. 2, peak output circuit 230 may generally include a storage circuit 240, a follower mode detector 250, a multiplexer (MUX) circuit 260, and a peak update circuit 270. Storage circuit 240 may be coupled to receive zero crossing signal $U_{ZC}$ 214 and maximum signal $U_{MAX}$ 222 and may be configured to store the value of maximum signal $U_{MAX}$ 222, which may be read by MUX circuit 260 as a stored maximum signal $U_{MAXSTR}$ 242. In one example, storage circuit 240 may include an 8-bit latch that stores the value of maximum signal $U_{MAX}$ 222 at its input and that updates stored maximum signal $U_{MAXSTR}$ 242 when zero crossing signal $U_{ZC}$ 214 transitions to a logic high. As such, in a particular search window, storage circuit 240 may store the value of maximum signal $U_{MAX}$ 222 from the immediately preceding search window (and thus, the detected peak value of digital line sense signal $U_{DSEN}$ 136 from the immediately preceding search window) as stored maximum signal $U_{MAXSTR}$ 242. In other examples, storage circuit 240 may include other memory circuits capable of storing binary signals.

As shown in FIG. 2, follower mode detector 250 may be coupled to receive maximum signal $U_{MAX}$ 222 and stored maximum signal $U_{MAXSTR}$ 242 and may be configured to output follower signal $U_{FOL}$ 252, which may indicate the operation mode of peak output circuit 230. In one example, follower signal $U_{FOL}$ 252 may be a binary signal that is logic high when peak output circuit 230 is in the follower mode of operation and logic low when peak output circuit 230 is in the normal mode of operation. Follower mode detector 250 may be configured to subtract the value represented by stored maximum signal $U_{MAXSTR}$ 242 from the value represented by maximum signal $U_{MAX}$ 222 and to compare the result with a follower threshold. Follower mode detector 250 may set follower signal $U_{FOL}$ 252 to logic high if the result is greater than the follower threshold and may set follower signal $U_{FOL}$ 252 to logic low if the result is not greater than the follower threshold. In one example, ADC 132 is configured to measure 3.75V as the maximum input voltage and the follower threshold is equal to 11 ADC counts, which may correspond to 15V in line sense signal $U_{LSEN}$ 112.

In the illustrated example, MUX circuit 260 may include a 2-to-1 multiplexer that is coupled to receive follower signal $U_{FOL}$ 252 at the select input of the MUX, stored maximum signal $U_{MAXSTR}$ 242 at the first input (IN0) of the MUX, and maximum signal $U_{MAX}$ 222 as the second input (IN1) of the MUX, and may be configured to output an input maximum signal $U_{INMAX}$ 274. In operation, MUX circuit 260 may set input maximum signal $U_{INMAX}$ 274 to stored maximum signal $U_{MAXSTR}$ 242 when follower signal $U_{FOL}$ 252 is logic low and may set input maximum signal $U_{INMAX}$ 274 to maximum signal $U_{MAX}$ 222 when follower signal $U_{FOL}$ 252 is logic high. Thus, in normal mode of operation (when follower signal $U_{FOL}$ 252 is logic low), input maximum signal $U_{INMAX}$ 274 may be set to the value of maximum signal $U_{MAX}$ 222 of the immediately preceding search window as stored by storage circuit 240. In the follower mode of operation (when follower signal $U_{FOL}$ 252 is logic high), input maximum signal $U_{INMAX}$ 274 may be set to the present sample of digital line sense signal $U_{DSEN}$ 136 as represented by the present value of maximum signal $U_{MAX}$ 222.

Peak update circuit 270 may be coupled to receive input maximum signal $U_{INMAX}$ 274 and may be configured to produce digital peak signal $U_{DPK}$ 140 that, in one example, may be an 8-bit binary signal. In operation, peak update circuit 270 may compare input maximum signal $U_{INMAX}$ 274 with a minimum peak threshold $V_{PKMIN}$ and may set digital peak signal $U_{DPK}$ 140 to either input maximum signal $U_{INMAX}$ 274 or the minimum peak threshold. In one example, peak update circuit 270 may set digital peak signal $U_{DPK}$ 140 to input maximum signal $U_{INMAX}$ 274 when input maximum signal $U_{INMAX}$ 274 is greater than the minimum peak threshold $V_{PKMIN}$ and may set digital peak signal $U_{DPK}$ 140 to the minimum peak threshold $V_{PKMIN}$ when input maximum signal $U_{INMAX}$ 274 is not greater than the minimum peak threshold $V_{PKMIN}$. In this way, peak update circuit 270 may ensure that digital peak signal $U_{DPK}$ 140 does not fall below a threshold ($V_{PKMIN}$). In one example, ADC 132 is configured to measure 3.75V as the maximum input voltage and the minimum peak threshold may be set to 41 ADC counts, which may correspond to 60V in line sense signal $U_{LSEN}$ 112.

In the illustrated example, digital peak signal $U_{DPK}$ 140 may undesirably fluctuate between consecutive search windows (e.g., from one half-cycle of input voltage $V_{AC}$ 102 to the next half-cycle) by a small amount (e.g., 1-2 counts) because, for example, the noise in ADC 132 may be coupled to digital peak detector circuit 138 through digital line sense signal $U_{DSEN}$ 136. In one example, in order to reduce this half-cycle to half-cycle variation in digital peak signal $U_{DPK}$ 140, digital peak detector circuit 138 may be coupled to provide digital peak signal $U_{DPK}$ 140 to a digital filter 280. In another embodiment, digital filter 280 may be a part of digital peak detector circuit 138. In operation, digital filter 280 may generate a filtered version of digital peak signal $U_{DPK}$ 140, which may be represented by a filtered digital peak signal $U_{FDPK}$ as shown in FIG. 2, by filtering digital peak signal $U_{DPK}$ 140 and provide the filtered digital peak signal $U_{FDPK}$ to drive circuit 140. Specifically, filter circuit 280 may be implemented as a low-pass filter whose cut-off frequency is set below the frequency at which digital peak signal $U_{DPK}$ 140 is updated with a new value by peak output circuit 230 so that the fluctuations in digital peak signal $U_{DPK}$ 140 between consecutive search windows are reduced. Moreover, digital filter 280 may have an additional mode of operation, which may be referred to as a fast mode, similar to the follower mode of operation of peak output circuit 230. In the fast mode, digital filter 280 may update the filtered digital peak signal $U_{FDPK}$ with digital peak signal $U_{DPK}$ 140 instead of filtering digital peak signal $U_{DPK}$ 140. In one example, digital filter 280 may operate in the fast mode when the value of digital peak signal $U_{DPK}$ 140 in the presently occurring search window is greater than the value of digital peak signal $U_{DPK}$ 140 from the immediately preceding search window by a certain threshold amount.

Figure 3:
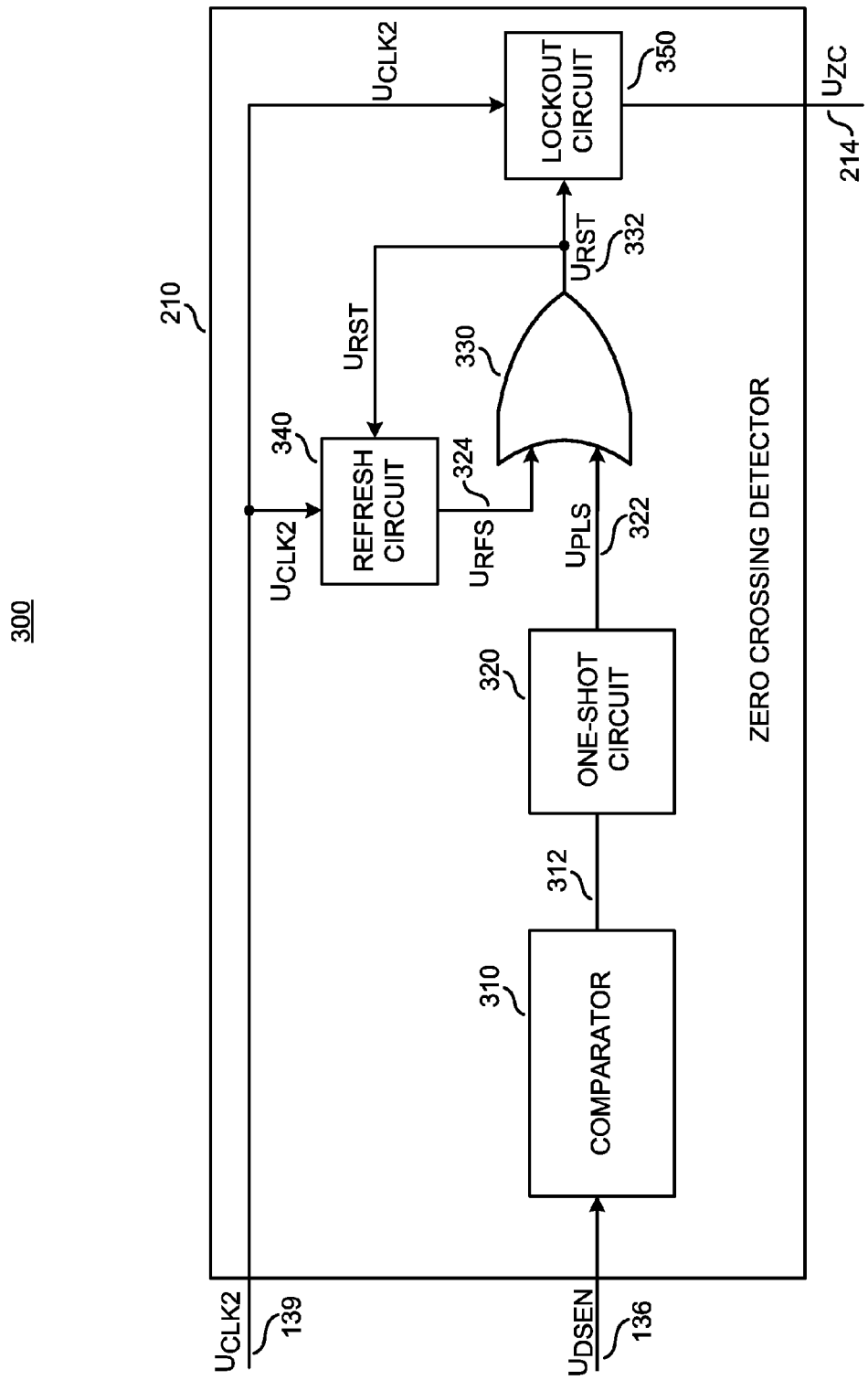
FIG. 3 illustrates a block diagram of an example zero crossing detector that may be used in the digital peak detector of FIG. 2 according to various examples of the present disclosure.

FIG. 3 illustrates a block diagram 300 of one example of zero crossing detector 210 that can be used in digital peak detector 138. As shown, zero crossing detector 210 may be coupled to receive digital line sense signal $U_{DSEN}$ 136 and second clock signal $U_{CLK2}$ 139 and may be configured to output zero crossing signal $U_{ZC}$ 214. Zero crossing detector 210 may generally include comparator 310, one-shot circuit 320, OR gate 330, refresh circuit 340, and a lockout circuit 350.

Comparator 310 may be coupled to receive digital line sense signal $U_{DSEN}$ 136 and may be configured to output comparator output 312, which may be a binary signal that indicates whether digital line sense signal $U_{DSEN}$ 136 is greater than the detection threshold. In one example, comparator 310 may set comparator output 312 to logic low when digital line sense signal $U_{DSEN}$ 136 is greater than the detection threshold and may set comparator output 312 to logic high when digital line sense signal $U_{DSEN}$ 136 is not greater than the detection threshold.

One-shot circuit 320 may be coupled to receive comparator output 312 and may be configured to generate a pulse signal $U_{PLS}$ 322 in response to comparator output 312. In one example, one-shot circuit 320 may output a logic high pulse (a signal that is logic high for a certain period of time) as pulse signal $U_{PLS}$ 322 when comparator output 312 transitions from logic low to logic high and may set pulse signal $U_{PLS}$ 322 to logic low at other times. In other words, one-shot circuit 320 may produce a logic high pulse in response to the rising edge of comparator output 312.

Refresh circuit 340 may be coupled to receive second clock signal $U_{CLK2}$ 139 and a reset signal $U_{RST}$ 332 and may be configured to output a refresh signal $U_{RFS}$ 324 that may indicate whether or not the refresh period has terminated. In one example, refresh circuit 340 may output a logic high pulse in refresh signal $U_{RFS}$ 324 to indicate that the refresh period has terminated. In operation, refresh circuit 340 may begin counting the number of second clock signal $U_{CLK2}$ 139 periods after reset signal $U_{RST}$ 332 becomes logic high. Refresh circuit 340 may then output a logic high pulse in refresh signal $U_{RFS}$ 324 after refresh circuit 340 counts a threshold number of periods of second clock signal $U_{CLK2}$ 139 (corresponding to the refresh period) before reset signal $U_{RST}$ 332 is again set to logic high (indicating that reset signal $U_{RST}$ 332 has not been asserted within the refresh period).

As shown in FIG. 3, OR gate 330 may be a two-input OR gate that is coupled to receive refresh signal $U_{RFS}$ 324 and pulse signal $U_{PLS}$ 322 and may be configured to output reset signal $U_{RST}$ 332. OR gate 330 may set reset signal $U_{RST}$ 332 to logic high when at least one of pulse signal $U_{PLS}$ 322 and refresh signal $U_{RFS}$ 324 is logic high. In this way, reset signal $U_{RST}$ 332 may be set to logic high when digital line sense signal $U_{DSEN}$ 136 falls to a value equal to or less than the detection threshold or when the refresh period terminates before digital line sense signal $U_{DSEN}$ 136 falls to a value equal to or less than the detection threshold.

Lockout circuit 350 may be coupled to receive reset signal $U_{RST}$ 332 and second clock signal $U_{CLK2}$ 139 and may be configured to output zero crossing signal $U_{ZC}$ 214. In operation, lockout circuit 350 may begin counting the number of second clock signal $U_{CLK2}$ 139 periods after reset signal $U_{RST}$ 332 becomes logic high and may produce a logic high pulse in zero crossing signal $U_{ZC}$ 214 if reset signal $U_{RST}$ 332 becomes logic high again only after a certain number of second clock signal $U_{CLK2}$ 139 periods (corresponding to the lockout period) from the instance that it had previously become logic high. That is, if reset signal $U_{RST}$ 332 becomes logic high within the lockout period after it had previously become logic high, lockout circuit 350 may keep zero crossing signal $U_{ZC}$ 214 at logic low level. In this manner, lockout circuit 350 may prevent zero crossing signal $U_{ZC}$ 214 from transitioning to logic high before the end of the lockout period, even if digital line sense signal $U_{DSEN}$ 136 falls to a value equal to or less than the detection threshold during the lockout period. In other words, lockout circuit 350 may set the minimum search window to be equal to the lockout period. This may advantageously reduce chances that zero crossing signal $U_{ZC}$ 214 may be triggered by a glitch (e.g., a sudden drop in voltage) in digital line sense signal $U_{DSEN}$ 136.

Figure 4A:
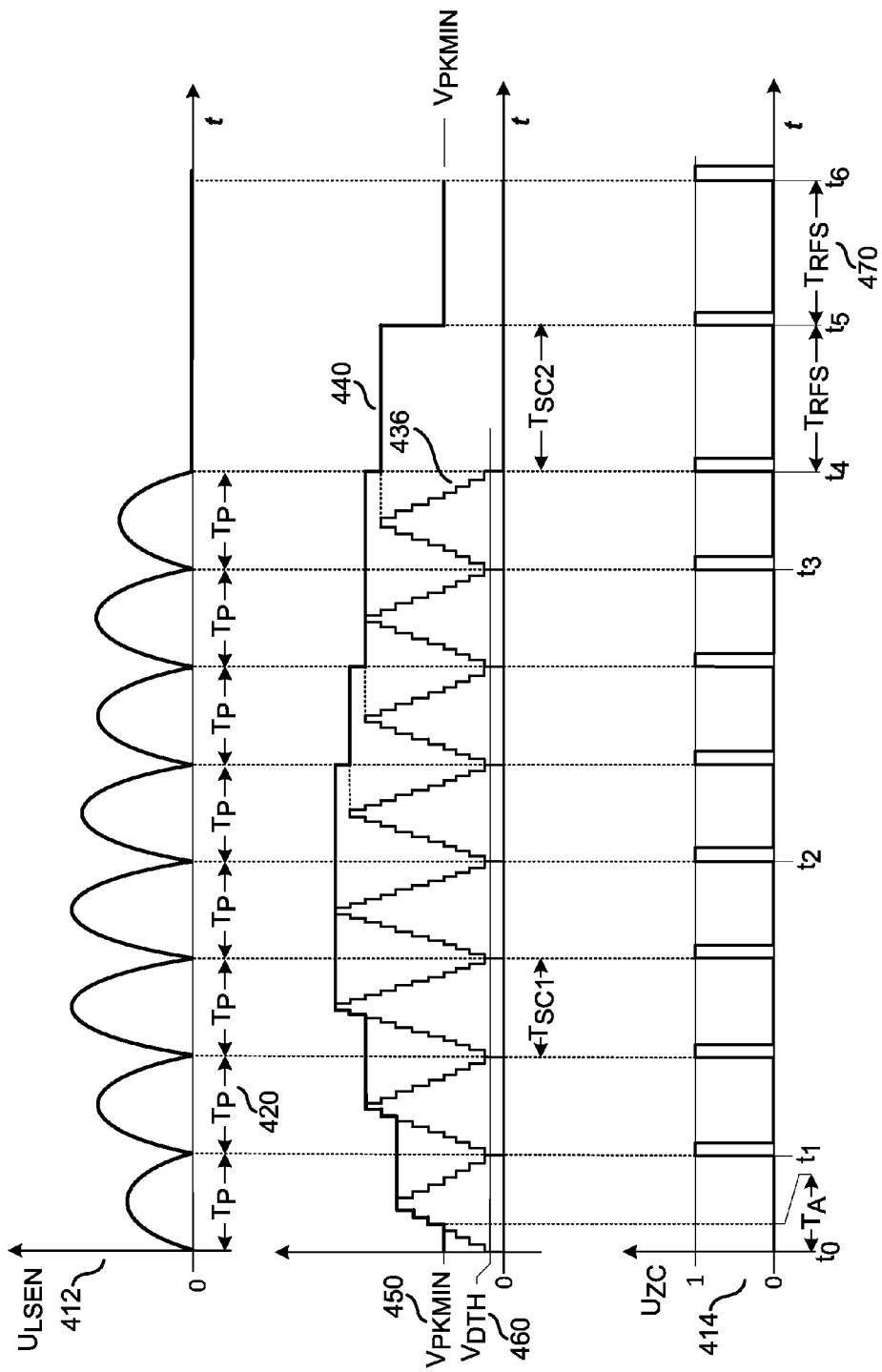
FIG. 4A shows an example timing diagram illustrating signals associated with the controller of the power converter of FIG. 1 according to various examples of the present disclosure.

FIG. 4A shows an example timing diagram illustrating signals associated with controller 130 of power converter 100 of FIG. 1. In the illustrated example, waveform 412 is one example of a waveform that is representative of line sense signal $U_{LSEN}$ 112. As shown, between time t0 and time t4, waveform 412 is a periodic (e.g., cyclical) sinusoidal signal having a period (e.g., cycle length) $T_P$ 420. Between time t4 and time t6, waveform 412 is substantially zero volts. As further shown, the peak value of waveform 412 may change from one cycle to another between time t0 and time t4.

Waveform 436 is one example of a waveform representative of digital line sense signal $U_{DSEN}$ 136 and waveform 440 is one example of a waveform representative of digital peak signal $U_{DPK}$ 140. Since waveform 436 corresponds to the digitized version of waveform 412, each cycle of waveform 436 may include several steps, with each step representing a digital count signal (sample) corresponding to the value of line sense signal $U_{LSEN}$ 112 at a particular instance in time. Also illustrated in FIG. 4A are values $V_{PKMIN}$ 450 and $V_{DTH}$ 460. Value $V_{PKMIN}$ 450 may be representative of the minimum peak threshold (e.g., used by peak update circuit 270) and value $V_{DTH}$ 460 may be representative of the detection threshold (e.g., used by zero crossing detector 210).

Waveform 414 is one example waveform representative of zero crossing signal $U_{ZC}$ 214 output by zero crossing detector 210. In the illustrated example, waveform 414 may be a binary signal that varies between digital 0 (logic low) and digital 1 (logic high). As shown, a period $T_{RFS}$ 470 represents the time periods between the consecutive pulses of waveform 414 from time t4 to time t6. In one example, period $T_{RFS}$ 470 corresponds to the refresh period. As further depicted, waveform 414 includes short pulses that become logic high (digital 1) when a transition in waveform 436 reaches value $V_{DTH}$ 460 during each period $T_P$ 420 from time t0 to time t4 and when the refresh period terminates every period $T_{RFS}$ 470 from time t4 to time t6. In the illustrated example, the transition that reaches value $V_{DTH}$ 460 corresponds to a falling edge in waveform 436 (e.g., a transition from a higher value to a lower value). In an alternative embodiment, the transition may correspond to a rising edge (e.g., a transition from a lower value to a higher value) in waveform 436. Waveform 414 is logic low (digital 0) at other times. Since the time periods between consecutive pulses of waveform 414 correspond to the search windows, each cycle of waveform 412 (and also, each cycle of waveform 436) between time t0 and time t4 and each refresh period between time t4 and time t6 represents one search window. For example, the cycle of waveform 412 between time t0 and time t1 represents a search window $T_{SC1}$ and the refresh period between time t4 and time t5 represents another search window $T_{SC2}$.

The operation of digital peak detector 138 may be explained with reference to FIG. 4A. In the first cycle of waveform 436 (between time t0 and time t1), samples of waveform 436 taken by running maximum finder circuit 220 may initially be less than value $V_{PKMIN}$ 450 for a time period $T_A$, meaning that maximum signal $U_{MAX}$ 222 is also less than value $V_{PKMIN}$ 450 during the same time period. As a result, peak update circuit 270 of digital peak detector 138 may set waveform 440 to the value $V_{PKMIN}$ 450.

If the next sample of waveform 436 after the time period $T_A$ in the first cycle is greater than stored maximum signal $U_{MAXSTR}$ 242 by more than the follower threshold, follower mode detector 250 may cause digital peak detector 138 to transition to the follower mode. As such, digital peak detector 138 may update waveform 440 with the new sample of waveform 436 at every sampling period until waveform 440 reaches the peak value of waveform 436. From that instance until the start of the next search window, digital peak detector 138 may remain in the follower mode, but waveform 440 may remain constant instead of following waveform 436. This is because waveform 436 decreases after waveform 440 reaches the peak value of waveform 436, causing maximum signal $U_{MAX}$ 222 to remain constant.

At time t1, the value of waveform 436 may drop to a value equal to or less than the detection threshold represented by value $V_{DTH}$ 460, causing waveform 414 to become logic high. As a result of waveform 414 becoming logic high, the next search window may begin, causing the peak value of waveform 436 from the immediately preceding search window to be stored in storage circuit 240 as stored maximum signal $U_{MAXSTR}$ 242, the maximum signal $U_{MAX}$ 222 to be set to zero, and follower mode detector 250 to transition to digital peak detector 138 to operate in the normal mode of operation. Since digital peak detector 138 may update waveform 440 with stored maximum signal $U_{MAXSTR}$ 242 each time that waveform 414 becomes logic high, waveform 440 may be set to the value of stored maximum signal $U_{MAXSTR}$ 242 and may remain constant until the sample of waveform 436 that is set as maximum signal $U_{MAX}$ 222 exceeds stored maximum signal $U_{MAXSTR}$ 242 by more than the follower threshold, causing digital peak detector 138 to transition to the follower mode. After transitioning to the follower mode, similar to the first search window, waveform 440 may be updated with the value of maximum signal $U_{MAX}$ 222 after each new sample of waveform 436 is taken every sampling period until waveform 440 reaches the peak value of waveform 436, at which point it may remain constant until the start of the next search window.

Digital peak detector 138 may continue to update waveform 440 in a similar manner until time t2. As illustrated, the amplitude of waveform 412 may decrease between time t2 and time t4 and thus, the peak value of waveform 436 may also decrease during that time. As a result, digital peak detector 138 may not switch to the follower mode between time t2 and time t4 and may instead operate in the normal mode of operation. In this mode, waveform 440 may be updated at the beginning of each new search window with the peak value of waveform 436 from the immediately preceding search window. For example, in a time interval between time t3 and time t4, waveform 440 may be set to a value that is greater than the peak value of waveform 436 in the same time interval because the waveform 440 may be set to the peak value of waveform 436 from the immediately preceding search window, which is greater than the peak value of waveform 436 in the search window between time t3 and time t4.

As mentioned above, waveform 436 may be substantially zero between time t4 and time t6. During this time, digital peak detector 138 may operate in the normal mode of operation and may update waveform 440 at intervals set by period $T_{RFS}$ 470, which may be larger than the cycle length of waveform 412 (period $T_P$ 420). In the illustrated example, digital peak detector 138 may set waveform 440 to value $V_{PKMIN}$ 450 between time t5 and time t6 because the peak value of waveform 436 from the immediately preceding search window (between time t4 and time t5) that is stored as stored maximum signal $U_{MAXSTR}$ 242 is substantially zero and thus, smaller than value $V_{PKMIN}$ 450.

Figure 4B:
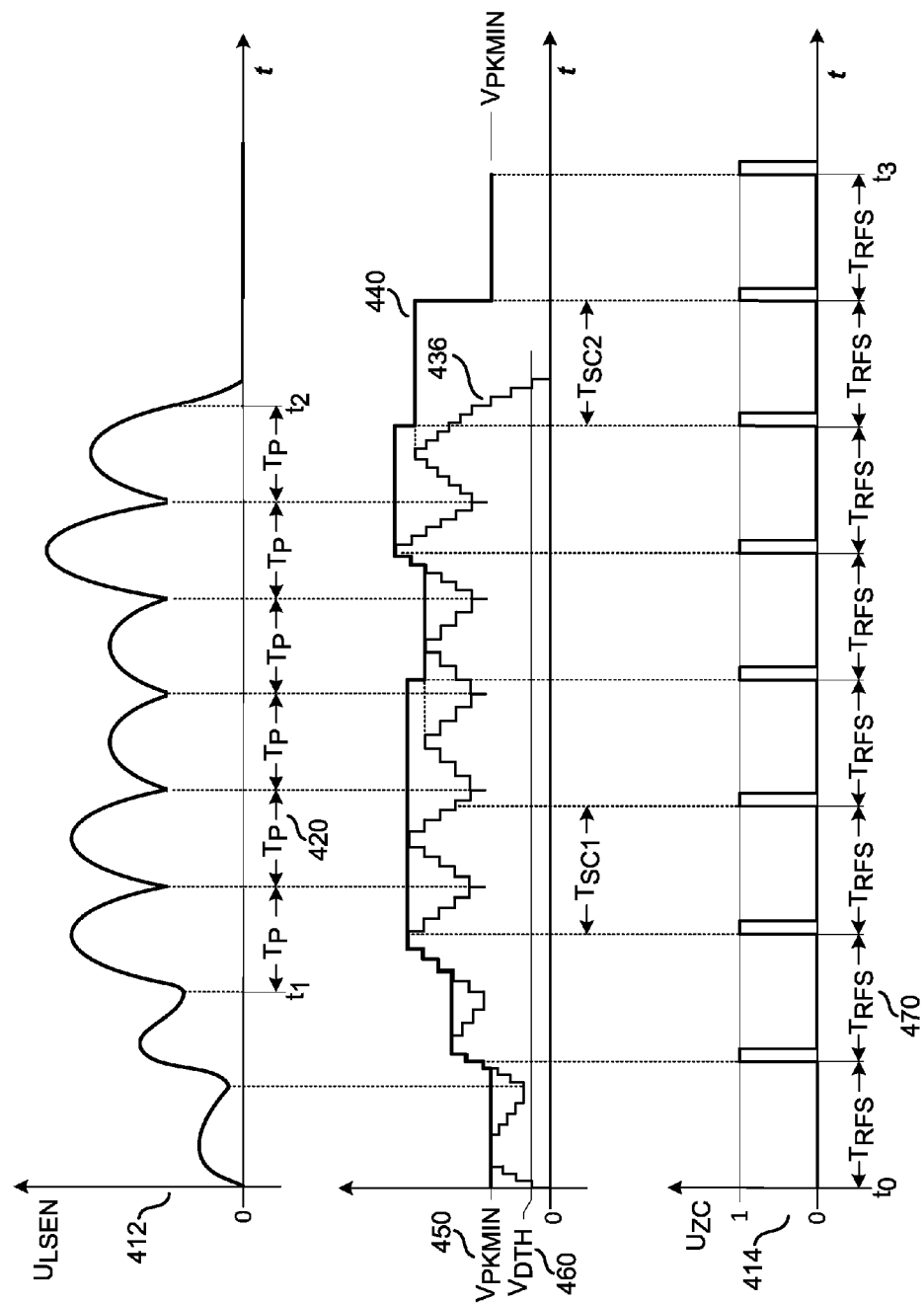
FIG. 4B shows another example timing diagram illustrating signals associated with the controller of the power converter of FIG. 1 according to various examples of the present disclosure.

FIG. 4B shows another example timing diagram illustrating signals that are associated with controller 130 of power converter 100 of FIG. 1. The illustrated waveforms and the operation of digital peak detector 138 is similar to those of FIG. 4A, described above, except that waveform 412 in FIG. 4B represents a sinusoidal signal between time t0 and time t2 that is distorted such that the cycle length of the first two cycles (from time t0 to time t1) is different than period $T_P$ 420. As further shown, waveform 412 is also elevated in a time interval between time t0 and time t2 such that the digitized version of waveform 412 (waveform 436) does not fall to a value equal to or less than the detection threshold $V_{DTH}$ 460 during that time interval except at time t0. As a result, waveform 414 may become logic high at intervals set to period $T_{RFS}$ 470, thereby also setting each search window to period $T_{RFS}$ 470 between time t0 and time t2. When operating in the normal mode of operation between time t0 and time t2, digital peak detector 138 may update waveform 440 with the peak value of waveform 436 from the immediately preceding search window at intervals set to period $T_{RFS}$ 470.

Figure 4C:
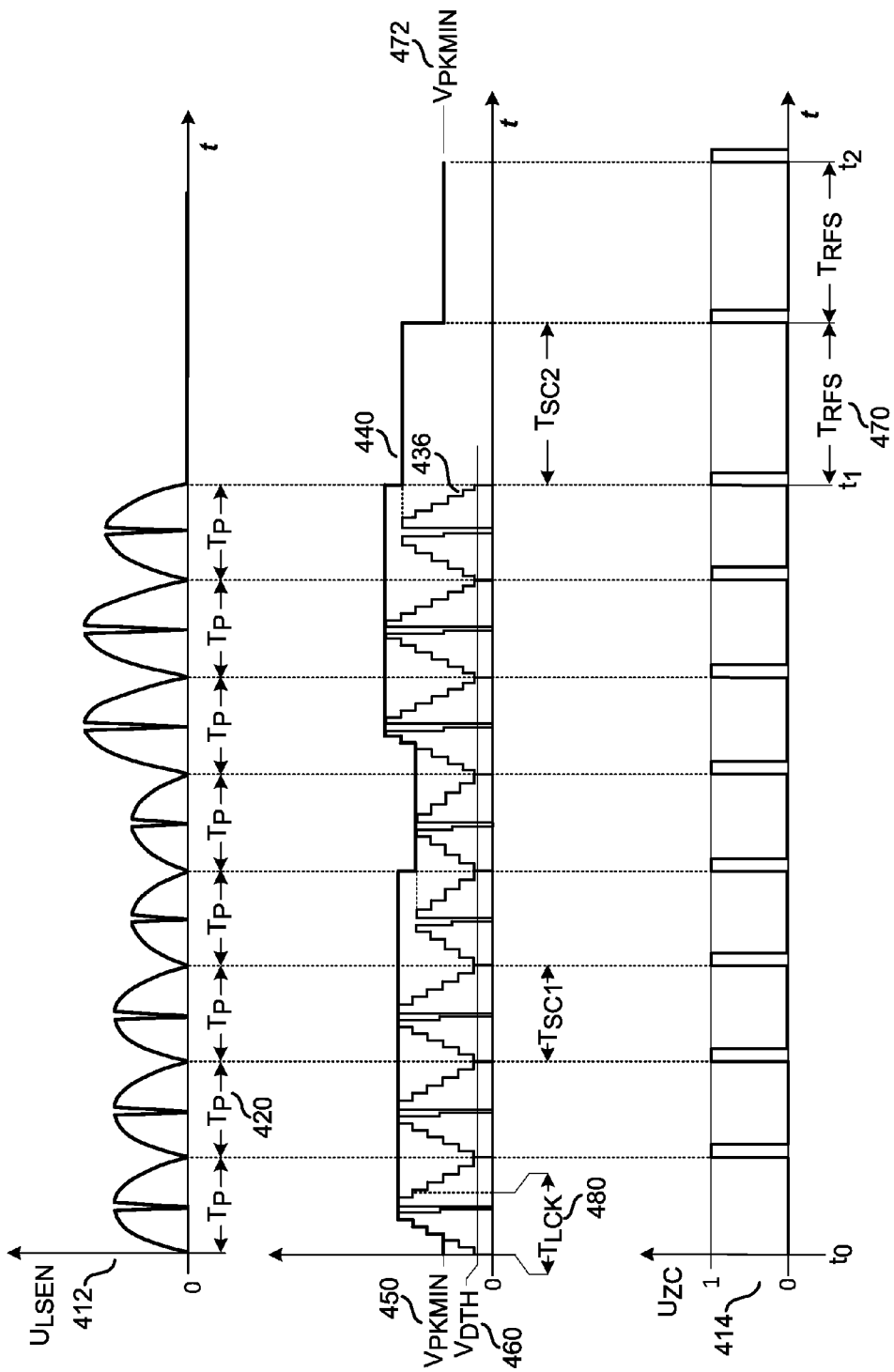
FIG. 4C shows yet another example timing diagram illustrating signals associated with the controller of the power converter of FIG. 1 according to various examples of the present disclosure.

FIG. 4C shows yet another example timing diagram illustrating signals associated with controller 130 of power converter 100 of FIG. 1. The illustrated waveforms and the operation of digital peak detector 138 are similar to that of FIG. 4A, described above, except that waveform 412 in FIG. 4C has a glitch that forces the value of waveform 412 to fall to zero volts at the middle of each cycle between time t0 and time t1. These decreases in waveform 412 may cause similar decreases in waveform 436 to a value equal to or less than the detection threshold $V_{DTH}$ 460. Such a decrease would trigger a logic high in waveform 414. However, as previously mentioned, zero crossing detector 210 of digital peak detector 138 may include lockout circuit 350 that prevents waveform 414 from becoming logic high again within a set amount of time (e.g., the lockout period) after the latest instance of waveform 414 becoming logic high, even if waveform 436 falls to a value equal to or less than the detection threshold $V_{DTH}$ 460. Thus, in the illustrated example of FIG. 4C, period $T_{LCK}$ 480 corresponds to the lockout period. In this manner, digital peak detector 138 may set a minimum search window to equal to period $T_{LCK}$ 480 such that any glitch occurring within period $T_{LCK}$ 480 of the start of a new search window may not cause digital peak detector 138 to terminate the search window. Therefore, in the depicted example, the operation of the digital peak detector 138 may not be compromised by the glitches in waveform 412. As such, when operating in the normal mode of operation, digital peak detector 138 may update waveform 440 with the peak value of waveform 436 from the immediately preceding search window at intervals set to period $T_P$ 420 or, in other words, to a time period between consecutive zero crossings of waveform 412.

Figure 5:
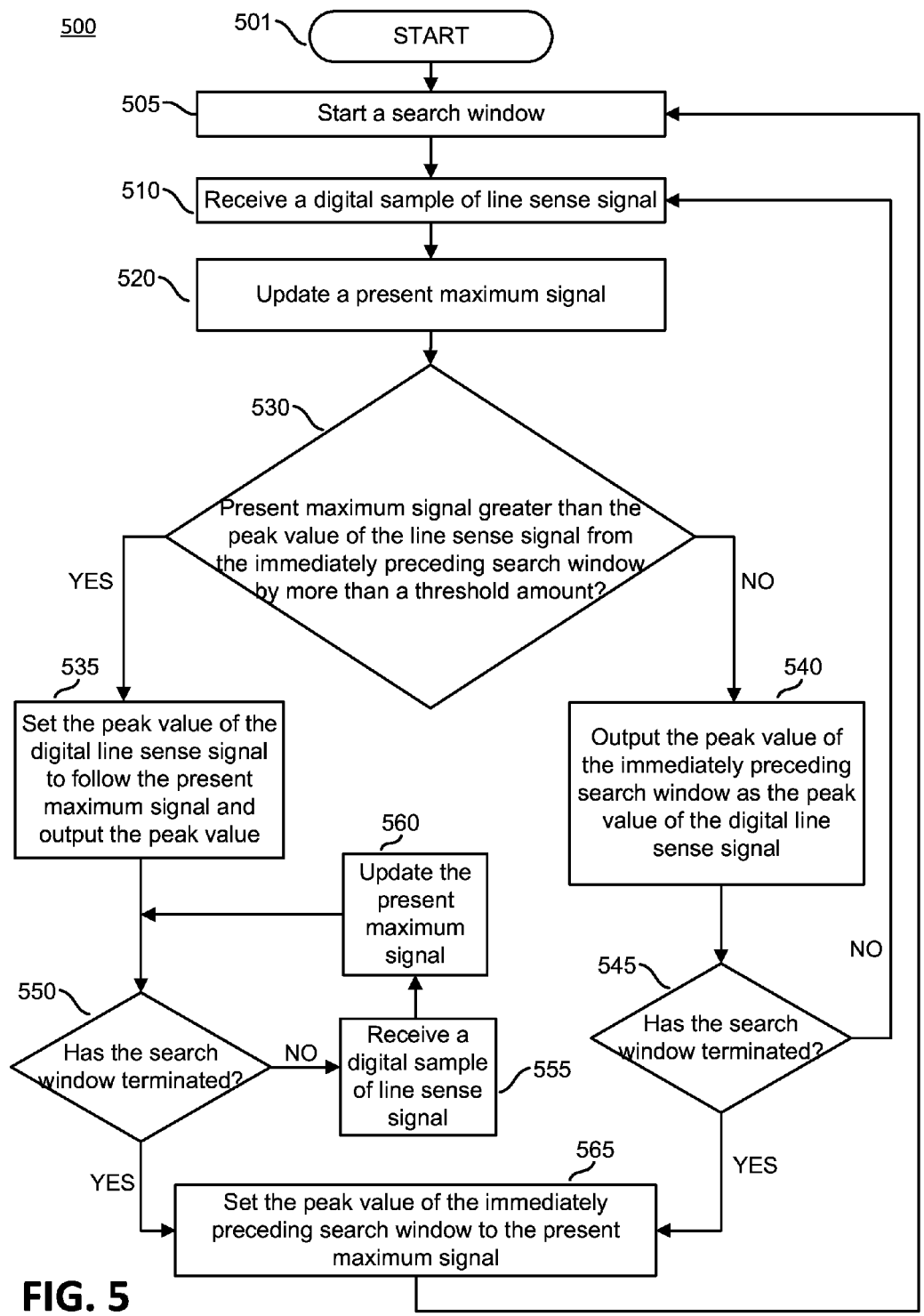
FIG. 5 shows a flowchart illustrating an example process for determining the peak value of each cycle of a cyclic input signal according to various examples of the present disclosure.

FIG. 5 shows a flowchart illustrating an example process 500 for determining the peak value of each cycle of a cyclic input signal. Process 500 may be performed using a circuit similar or identical to digital peak detector 138. The process may begin at block 501. At block 505, a search window may be started. In one example, the search window may be started in response to an indicator signal (e.g., zero crossing signal $U_{ZC}$ 214) becoming logic high, which may correspond to the falling edge of a digital line sense signal reaching a detection threshold. For example, comparator 310 of zero crossing detector 210 may compare the value of the digital line sense signal $U_{DSEN}$ 136 to the detection threshold and may change comparator output 312 from logic low to logic high if digital line sense signal $U_{DSEN}$ 136 has reached the detection threshold. This may result in zero crossing signal $U_{ZC}$ 214 to be asserted starting a new search window. In another example, the zero crossing signal $U_{ZC}$ 214 becoming logic high may correspond to the rising edge of the digital line sense signal $U_{DSEN}$ 136 reaching the detection threshold.

At block 510, a digital sample of a line sense signal may be received. In one example, a digital sample of a line sense signal (e.g., in the form of digital line sense signal $U_{DSEN}$ 136) may be received by a peak detection circuit (e.g., digital peak detector circuit 138). The digital sample of the line sense signal may be generated by an ADC (e.g., ADC 132) from a line sense signal (e.g., line sense signal $U_{LSEN}$ 112) taken from an input signal (e.g., input voltage $V_{AC}$ 102 or rectified input voltage $V_{RECT}$ 106) of a switched mode power converter (e.g., switched mode power converter 100).

At block 520, a present maximum signal may be updated based on the digital sample of the line sense signal received at block 510. In one example, a circuit similar or identical to running maximum finder circuit 220 may receive a digital sample (e.g., $U_{DSEN}$ 136 from ADC 132) and may generate a present maximum signal (e.g., maximum signal $U_{MAX}$ 222) based on the digital sample. If the digital sample of the line sense signal received at block 510 is greater than the value represented by maximum signal $U_{MAX}$ 222, running maximum finder circuit 220 may change maximum signal $U_{MAX}$ 222 to represent the value of the new, larger sample. If, however, the new sample is not greater than the value represented by maximum signal $U_{MAX}$ 222, running maximum finder circuit 220 may leave maximum signal $U_{MAX}$ 222 unchanged.

At block 530, the value of the present maximum signal may be compared to the peak value of the digital line sense signal from the immediately preceding search window. In one example, follower mode detector 250 may compare the maximum signal $U_{MAX}$ 222 with a stored maximum signal $U_{MAXSTR}$ 242 from storage circuit 240. If maximum signal $U_{MAX}$ 222 is greater than the peak value of the digital line sense signal from the immediately preceding search window (e.g., stored maximum signal $U_{MAXSTR}$ 242) by more than a threshold amount (e.g., the follower threshold), follower mode detector 250 may set follower signal $U_{FOL}$ 252 to logic high, causing process 500 to proceed to block 535.

At block 535, the peak value of the digital line sense signal may be set to follow the present maximum signal. In one example, if follower mode detector 250 determines that maximum signal $U_{MAX}$ 222 updated at block 520 is greater than the stored maximum signal $U_{MAXSTR}$ 242 by more than the threshold, follower signal $U_{FOL}$ 252 may be set to a logic high, causing MUX circuit 260 to output maximum signal $U_{MAX}$ 222 as input maximum signal $U_{INMAX}$ 274. As a result, peak update circuit 270 may output the greater of input maximum signal $U_{INMAX}$ 274 (which is representative of maximum signal $U_{MAX}$ 222) and a minimum peak threshold $V_{PKMIN}$ as digital peak signal $U_{DPK}$ 140. In this way, digital peak signal $U_{DPK}$ 140 may be updated with the new sample of the line sense signal at every sampling period of the ADC while the peak value of the digital line sense signal is set to follow the present maximum signal.

At block 550, it may be determined whether or not the search window has terminated. In one example, the search window may terminate in response to the indicator signal becoming logic high in response to the falling edge of digital line sense signal reaching the detection threshold. For example, one-shot circuit 320 may produce a logic high pulse in response to the rising edge of comparator output 312 when the falling edge of digital line sense signal $U_{DSEN}$ 136 reaches the detection threshold and subsequently, may cause the indicator signal to be asserted resulting in the termination of the presently occurring search window (and the start of a new search window). If the search window has not terminated, process 500 may proceed to block 555.

At block 555, a digital sample of the line sense signal may be received in a manner similar or identical to block 510. The process may then proceed to block 560, where the present maximum signal may be updated in a manner similar or identical to block 520. The process may then return to block 550.

If it is determined at block 550 that the search window has terminated, the process may proceed to block 565. At block 565, the peak value of the immediately preceding search window may be set to the value of the present maximum signal. For example, storage circuit 240 may include an 8-bit latch that stores the value of maximum signal $U_{MAX}$ 222 at its input and that updates the stored maximum signal $U_{MAXSTR}$ 242 of the immediately preceding search window when zero crossing signal $U_{ZC}$ 214 transitions to a logic high. The process may then return to block 505.

Referring back to block 530, if it is instead determined that the present maximum signal is not greater than the peak value of the digital line sense signal from the immediately preceding search window by the threshold, process 500 proceeds to block 540 where the peak value of the immediately preceding search window may be output as the peak value of the digital line sense signal. For example, if follower mode detector 250 determines that maximum signal $U_{MAX}$ 222 is not greater than the peak value of the digital line sense signal from the immediately preceding search window (e.g., stored maximum signal $U_{MAXSTR}$ 242) by the threshold amount, follower mode detector 250 may set follower signal $U_{FOL}$ 252 to a logic low, causing MUX circuit to output the peak value of the digital line sense signal from the immediately preceding search window (e.g., stored maximum signal $U_{MAXSTR}$ 242) as input maximum signal $U_{INMAX}$ 274. As a result, peak update circuit 270 may output the greater of the peak value of the digital line sense signal from the immediately preceding search window (e.g., stored maximum signal $U_{MAXSTR}$ 242) and minimum peak threshold $V_{PKMIN}$ as the peak value of the digital line sense signal (e.g. digital peak signal $U_{DPK}$ 140). The process may then proceed to block 545, where it may be determined whether or not the search window has terminated in a manner similar or identical to block 550.

If it is determined at block 550 that the search window has terminated, the process may proceed to block 565. If it is instead determined that the search window has not terminated, the process may return to block 510.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A digital peak detection circuit for use in a controller of a power converter, the digital peak detection circuit comprising:
   an input to be coupled to receive a digital sample of a line sense signal that is representative of an input voltage of the power converter;
   a first comparison circuit coupled to compare the digital sample with a present maximum signal representing a maximum value of the line sense signal for a presently occurring search window and, in response to the digital sample exceeding the present maximum signal, update the present maximum signal;
   a second comparison circuit coupled to compare the present maximum signal with a peak value of the line sense signal from an immediately preceding search window and output an output signal, wherein in response to the present maximum signal being greater than the peak value of the line sense signal from the immediately preceding search window by more than a threshold amount, the second comparison circuit causes the output signal to follow the present maximum signal until an end of the presently occurring search window, and wherein in response to the present maximum signal not being greater than the peak value of the line sense signal from the immediately preceding search window by more than the threshold amount, the second comparison circuit causes the output signal to represent the peak value of the line sense signal from the immediately preceding search window.

2. The digital peak detection circuit of claim 1, wherein a duration of each search window is approximately one half of a line cycle of the line sense signal.

3. The digital peak detection circuit of claim 1, wherein the first comparison circuit is further coupled to maintain the present maximum signal in response to the digital sample not being greater than the present maximum signal.

4. The digital peak detection circuit of claim 1, wherein the input is coupled to receive a digital line sense signal comprising the digital sample of the line sense signal.

5. The digital peak detection circuit of claim 4, wherein the first comparison circuit is further coupled to receive an indicator signal and update the present maximum signal in response to the digital line sense signal and the indicator signal.

6. The digital peak detection circuit of claim 1, wherein the second comparison circuit is further coupled to output a minimum voltage signal in response to the output signal being less than a minimum voltage.

7. A digital peak detection circuit for use in a controller of a power converter, the digital peak detection circuit configured to:

receive a digital sample of a line sense signal that is representative of an input voltage of the power converter;

update a present maximum signal based on the digital sample of the line sense signal, wherein the present maximum signal represents a maximum value of the line sense signal for a presently occurring search window;

in response to the present maximum signal being greater than a peak value of the line sense signal from an immediately preceding search window by more than a threshold amount, output a peak detection signal that follows the present maximum signal until an end of the presently occurring search window; and in response to the present maximum signal not being greater than the peak value of the line sense signal from the immediately preceding search window by more than the threshold amount, output a peak detection signal representing the peak value of the line sense signal from the immediately preceding search window.

8. The digital peak detection circuit of claim 7, wherein updating the present maximum signal based on the digital sample of the line sense signal comprises:

in response to the digital sample of the line sense signal being greater than the present maximum signal, replacing the present maximum signal with the digital sample of the line sense signal; and in response to the digital sample of the line sense signal not being greater than the present maximum signal, maintaining the present maximum signal.

9. The digital peak detection circuit of claim 7, further comprising a digital filter coupled to receive the peak detection signal and output a filtered version of the peak detection signal.

10. The digital peak detection circuit of claim 7, wherein receiving the digital sample of the line sense signal comprises receiving a digital line sense signal comprising the digital sample of the line sense signal, and wherein the digital peak detection circuit comprises:

a zero crossing detection circuit coupled to receive the digital line sense signal, wherein the zero crossing detection circuit is configured to output a pulse in an indicator signal in response to a rising edge of the digital line sense signal reaching a detection threshold value;

a running maximum finder circuit coupled to receive the digital line sense signal and the indicator signal, wherein the running maximum finder circuit is configured to update the present maximum signal based on the digital line sense signal and the indicator signal; and a peak output circuit coupled to receive the indicator signal and the present maximum signal, wherein the peak output circuit is configured to output the peak detection signal.

11. The digital peak detection circuit of claim 7, wherein receiving the digital sample of the line sense signal comprises receiving a digital line sense signal comprising the digital sample of the line sense signal, and wherein the digital peak detection circuit comprises:

a zero crossing detection circuit coupled to receive the digital line sense signal, wherein the zero crossing detection circuit is configured to output a pulse in an indicator signal in response to a falling edge of the digital line sense signal reaching a detection threshold value;

a running maximum finder circuit coupled to receive the digital line sense signal and the indicator signal, wherein the running maximum finder circuit is configured to update the present maximum signal based on the digital line sense signal and the indicator signal; and a peak output circuit coupled to receive the indicator signal and the present maximum signal, wherein the peak output circuit is configured to output the peak detection signal.

12. The digital peak detection circuit of claim 11 wherein the immediately preceding search window and the presently occurring search window are bound by pairs of consecutive pulses in the indicator signal.

13. The digital peak detection circuit of claim 11, wherein the peak output circuit comprises:

a memory configured to store the peak value of the line sense signal from the immediately preceding search window, wherein the memory is coupled to receive the present maximum signal and the indicator signal, and wherein the memory is further configured to replace the peak value of the line sense signal from the immediately preceding search window with a value of the present maximum signal in response to the pulse in the indicator signal;

a follower mode detection circuit coupled to receive the present maximum signal and the peak value of the line sense signal from the immediately preceding search window, wherein the follower mode detection circuit is configured to output a follower mode signal in response to a difference between the present maximum signal and the peak value of the line sense signal from the immediately preceding search window being greater than a follower threshold;

a selection circuit coupled to receive the present maximum signal, the peak value of the line sense signal from the immediately preceding search window, and the follower mode signal, wherein the selection circuit is configured to:

output the present maximum signal in response to the follower mode signal having a first value; and output the peak value of the line sense signal from the immediately preceding search window in response to the follower mode signal having a second value; and a peak update circuit coupled to receive an output of the selection circuit, wherein the peak update circuit is configured to:

compare the output of the selection circuit with a minimum peak voltage; and output a greater of the minimum peak voltage and the output of the selection circuit as the peak detection signal.

14. The digital peak detection circuit of claim 11, wherein the zero crossing detection circuit comprises:

a refresh timer configured to limit a maximum duration between consecutive pulses of the indicator signal; and a lockout timer configured to limit a minimum duration between said consecutive pulses of the indicator signal.

15. The digital peak detection circuit of claim 7, wherein the digital peak detection circuit is coupled to receive the digital sample of the line sense signal from an analog-to-digital converter coupled to receive the line sense signal.

16. The digital peak detection circuit of claim 7, wherein the analog-to-digital converter is coupled to receive a first clock signal from a clock generator, and wherein the digital peak detection circuit is coupled to receive a second clock signal from the clock generator.

17. A power converter comprising:

an output sense circuit configured to output a feedback signal representative of an output of the power converter; and a controller coupled to receive the feedback signal, wherein the controller comprises:

a digital peak detection circuit configured to:
: receive a digital sample of a line sense signal that is representative of an input voltage of the power converter;
: update a present maximum signal based on the digital sample of the line sense signal, wherein the present maximum signal represents a maximum value of the line sense signal for a presently occurring search window;
: in response to the present maximum signal being greater than a peak value of the line sense signal from an immediately preceding search window by more than a threshold amount, output a peak detection signal that follows the present maximum signal until an end of the present search window; and
: in response to the present maximum signal not being greater than the peak value of the line sense signal from the immediately preceding search window by more than the threshold amount, output a peak detection signal representing the peak value of the line sense signal from the immediately preceding search window; and
: a drive circuit coupled to receive the peak detection signal and the feedback signal, wherein the drive circuit is configured to output a drive signal for controlling a power switch based at least in part on the peak detection signal and the feedback signal.

18. The power converter of claim 17, wherein the digital peak detection circuit includes a digital filter coupled to receive the peak detection signal and output a filtered version of the peak detection signal.

19. The power converter of claim 17, wherein updating the present maximum signal based on the digital sample of the line sense signal comprises:
: in response to the digital sample of the line sense signal being greater than the present maximum signal, replacing the present maximum signal with the digital sample of the line sense signal; and
: in response to the digital sample of the line sense signal not being greater than the present maximum signal, maintaining the present maximum signal.

20. The power converter of claim 17, wherein receiving the digital sample of the line sense signal comprises receiving a digital line sense signal comprising the digital sample of the line sense signal, and wherein the digital peak detection circuit comprises:
: a zero crossing detection circuit coupled to receive the digital line sense signal, wherein the zero crossing detection circuit is configured to output a pulse in an indicator signal in response to a rising edge of the digital line sense signal reaching a detection threshold value;
: a running maximum finder circuit coupled to receive the digital line sense signal and the indicator signal, wherein the running maximum finder circuit is configured to update the present maximum signal based on the digital line sense signal and the indicator signal; and
: a peak output circuit coupled to receive the indicator signal and the present maximum signal, wherein the peak output circuit is configured to output the peak detection signal.

21. The power converter of claim 17, wherein receiving the digital sample of the line sense signal comprises receiving a digital line sense signal comprising the digital sample of the line sense signal, and wherein the digital peak detection circuit comprises:
: a zero crossing detection circuit coupled to receive the digital line sense signal, wherein the zero crossing detection circuit is configured to output a pulse in an indicator signal in response to a falling edge of the digital line sense signal reaching a detection threshold value;
: a running maximum finder circuit coupled to receive the digital line sense signal and the indicator signal, wherein the running maximum finder circuit is configured to update the present maximum signal based on the digital line sense signal and the indicator signal; and
: a peak output circuit coupled to receive the indicator signal and the present maximum signal, wherein the peak output circuit is configured to output the peak detection signal.

22. The power converter of claim 21, wherein the peak output circuit comprises:
: a memory configured to store the peak value of the line sense signal from the immediately preceding search window, wherein the memory is coupled to receive the present maximum signal and the indicator signal, and wherein the memory is further configured to replace the peak value of the line sense signal from the immediately preceding search window with a value of the present maximum signal in response to a pulse in the indicator signal;
: a follower mode detection circuit coupled to receive the present maximum signal and the peak value of the line sense signal from the immediately preceding search window, wherein the follower mode detection circuit is configured to output a follower mode signal in response to a difference between the present maximum signal and the peak value of the line sense signal from the immediately preceding search window being greater than a follower threshold;
: a selection circuit coupled to receive the present maximum signal, the peak value of the line sense signal from the immediately preceding search window, and the follower mode signal, wherein the selection circuit is configured to:
: : output the present maximum signal in response to the follower mode signal having a first value; and
: : output the peak value of the line sense signal from the immediately preceding search window in response to the follower mode signal having a second value; and
: a peak update circuit coupled to receive an output of the selection circuit, wherein the peak update circuit is configured to:
: : compare the output of the selection circuit with a minimum peak voltage; and
: : output a greater of the minimum peak voltage and the output of the selection circuit as the peak detection signal.

23. The power converter of claim 21, wherein the zero crossing detection circuit comprises:
: a refresh timer configured to limit a maximum duration between consecutive pulses of the indicator signal; and
: a lockout timer configured to limit a minimum duration between said consecutive pulses of the indicator signal.

24. The power converter of claim 17, further comprising an analog-to-digital converter coupled to receive the line sense signal, wherein the digital peak detection circuit is coupled to receive the digital sample of the line sense signal from the analog-to-digital converter.

25. The power converter of claim 24, further comprising a clock generator, wherein the analog-to-digital converter is coupled to receive a first clock signal from the clock generator, and wherein the digital peak detection circuit is coupled to receive a second clock signal from the clock generator.

26. A method for determining a peak value of an input signal, the method comprising:
   receiving a digital sample of a line sense signal that is representative of an input voltage of a power converter;
   updating a present maximum signal based on the digital sample of the line sense signal, wherein the present maximum signal represents a maximum value of the line sense signal for a presently occurring search window;
   in response to the present maximum signal being greater than a peak value of the line sense signal from an immediately preceding search window by more than a threshold amount, outputting a peak detection signal that follows the present maximum signal until an end of the presently occurring search window; and
   in response to the present maximum signal not being greater than the peak value of the line sense signal from the immediately preceding search window by more than the threshold amount, outputting a peak detection signal representing the peak value of the line sense signal from the immediately preceding search window.

27. The method of claim 26, wherein updating the present maximum signal based on the digital sample of the line sense signal comprises:
   in response to the digital sample of the line sense signal being greater than the present maximum signal, replacing the present maximum signal with the digital sample of the line sense signal; and
   in response to the digital sample of the line sense signal not being greater than the present maximum signal, maintaining the present maximum signal.

28. The method of claim 26, wherein receiving the digital sample of the line sense signal comprises receiving a digital line sense signal comprising the digital sample of the line sense signal, and wherein the immediately preceding search window and the presently occurring search window are bound by occurrences of a falling edge of the digital line sense signal reaching a detection threshold value.

29. The method of claim 26, wherein receiving the digital sample of the line sense signal comprises receiving a digital line sense signal comprising the digital sample of the line sense signal, and wherein the method further comprises:
   detecting a present search window in response to a falling edge of the digital line sense signal reaching a detection threshold value; and
   setting the peak value of the line sense signal from the immediately preceding search window to the present maximum signal in response to detecting the end of the presently occurring search window.

30. The method of claim 29, further comprising:
   receiving a second digital sample of the line sense signal;
   updating the present maximum signal based on the second digital sample of the line sense signal;
   in response to the present maximum signal being greater than the peak value of the line sense signal from the immediately preceding search window by more than the threshold amount, outputting the peak detection signal that follows the present maximum signal until the end of the presently occurring search window; and
   in response to an updated present maximum signal not being greater than the peak value of the line sense signal from the immediately preceding search window by more than the threshold amount, outputting the peak detection signal representing the peak value of the line sense signal from the immediately preceding search window.

* * * * *